United States Patent
Steinbach et al.

(10) Patent No.: US 7,290,810 B2
(45) Date of Patent: Nov. 6, 2007

(54) DEVICE FOR ABSORPTION OF IMPACT ENERGY ON AN AUTOMOBILE

(75) Inventors: Guido Steinbach, Sankt Augustin (DE); Stefan Worms, Sinzig (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 226 days.

(21) Appl. No.: 11/180,041

(22) Filed: Jul. 12, 2005

(65) Prior Publication Data

US 2006/0012194 A1    Jan. 19, 2006

(30) Foreign Application Priority Data

Jul. 16, 2004  (DE) ...................... 10 2004 034 577

(51) Int. Cl.
*B60R 19/40* (2006.01)
(52) U.S. Cl. ...................................... 293/132; 188/371
(58) Field of Classification Search ................ 293/132, 293/133; 296/187.09; 188/371, 376, 377
See application file for complete search history.

(56) References Cited

U.S. PATENT DOCUMENTS 6,189,941 B1 * 2/2001 Nohr .......................... 293/118

FOREIGN PATENT DOCUMENTS

| DE | 4121497 | 2/1993 |
|---|---|---|
| DE | 197 00022 | 7/1998 |
| DE | 19942167 | 3/2001 |
| DE | 10159 864 A1 | 6/2003 |
| DE | 10243460 | 4/2004 |

\* cited by examiner

*Primary Examiner*—Joseph D. Pape
(74) *Attorney, Agent, or Firm*—Christa Hildebrand; Norris McLaughlin & Marcus, PA

(57) ABSTRACT

A device for absorption of impact energy on an automobile is provided, with at least one energy absorber arranged between a bumper and the vehicle chassis, which has a deformation element which deforms in the event of a collision. The device adapts to different driving and risk situations and which has a simple design and can be manufactured cost-effectively. The absorption characteristic of the energy absorber is implemented to adapt to the driving situation. This is achieved by transferring the impact energy to the deformation element inside the energy absorber via at least one force introduction element which, depending on the respective driving situation, either transfers the impact energy directly to the deformation element for conversion into deformation work, or initially performs an excursion-limited motion inside the energy absorber and only thereafter transfers the impact energy to the deformation element for conversion into deformation work.

8 Claims, 2 Drawing Sheets

A - A

DEVICE FOR ABSORPTION OF IMPACT ENERGY ON AN AUTOMOBILE

BACKGROUND OF THE INVENTION

1. Field of the Invention

The present invention relates to a device for absorption of impact energy on an automobile, with at least one energy absorber arranged between a bumper and the vehicle chassis. More particularly, the invention relates to devices of this type, wherein the energy absorber has a deformation element which deforms in the event of a collision, whereby the energy imparted on the vehicle during the collision is at least partially converted by the deformation into deformation work.

2. Description of the Related Art

Several different solutions are already known for transferring kinetic energy generated during a collision of a vehicle to chassis via the bumper. More particularly, energy absorption systems are generally differentiated in that the elements change reversibly or an irreversibly during impact. The first category includes, for example, systems which dissipate the kinetic energy transferred to to the vehicle via the bumper by hydraulic damping elements. However, such systems are relatively expensive and tend to require installation space which is unavailable in many typical applications. Disadvantageous is also the relatively high weight of such systems. For this reason, absorption systems with hydraulic damping elements are typically not used in vehicles for the European mass market, in particular not in passenger vehicles.

Absorber systems with reversibly changing elements are therefore typically used in passenger vehicles. Some conventional systems use as energy absorbers crash boxes or so-called impact absorbers between the bumper and the vehicle chassis. Such absorbers include a deformation element which deforms on impact and dissipates the generated kinetic energy by conversion into deformation work. A bumper system with a energy absorber of this type is known, for example, from DE 102 434 60 A1. Problematic with this and comparable systems is, for example, that the absorption characteristic is the same, regardless if a vehicle equipped in this manner collides with another vehicle, a stationary obstacle, or with a pedestrian. Pedestrians can therefore be seriously injured in such situations. The automotive industry and suppliers have therefore attempted since some time to reduce the risk of injury to pedestrians by appropriate design measures.

For example, DE 101 59 864 A1 discloses a solution, wherein sensors determine the most likely type of an impending collision. As described in this published patent application, in the event of a collision with a pedestrian, the end of the front hood facing the windshield is slightly raised by corresponding actuators arranged on the vehicle, and a crossbeam arranged below the bumper is displaced in the direction of travel. The object of this measure is to avoid running over the pedestrian and to make possible for the body of the pedestrian to roll across the vehicle. Nevertheless, the solution is hardly suitable to prevent fractures in the lower leg, because these are auxiliary measures which are less intended to affect the manner in which the impact energy is dissipated, but rather attempt to remove the body of an affected pedestrian from the immediate danger zone on a predetermined trajectory in the event of an impact. However, the impact energy has then already affected the knee or the lower leg of the pedestrian.

SUMMARY OF THE INVENTION

It is the object of the invention to provide a device for absorbing the impact energy imparted on the vehicle, wherein the device is suitable for different driving and danger situations, has a simple design, and can be manufactured cost-effectively.

The object is solved by a device with the features of the independent claim. Advantageous embodiments or modifications of the device are recited in the dependent claims.

The proposed device includes essentially a conventional bumper and at least one energy absorber or impact absorber arranged between the bumper and the vehicle chassis. Also in a conventional manner, the energy absorber has a deformation element which deforms upon impact and at least partially converts the applied kinetic energy into deformation work. However, according to the invention, the absorption characteristic of the aforementioned energy absorber is designed to depend on the driving situation. This is achieved by transferring the impact energy to the deformation element inside the energy absorber through at least one force introduction element which, depending on the actual driving situation, transfers the impact energy directly to the deformation element for conversion into deformation work, or initially performs a limited excursion inside the energy absorber and only thereafter transfers the impact energy to the deformation element for conversion into deformation work. In the first situation, the force introduction element, optionally in cooperation with additional elements, forms a rigid arrangement which transfers the impact energy directly to the deformation element. In the second situation, the kinetic energy is initially received by the force introduction element and converted into an separate motion of the force introduction element, whereafter the kinetic energy is transferred to the deformation element. An energy absorber constructed in this manner thus essentially represents a switchable impact absorber. The switchability is implemented by arranging an actuator inside the energy absorber, which either blocks or releases the force introduction element for the aforementioned limited excursion. The actuator is operated based on the driving situation as determined by the vehicle motion and/or based on a driving situation detected by sensors, so that a determination can be made if a collision with another vehicle, with a stationary obstacle, or with the pedestrian can be expected.

According to an advantageous embodiment of the invention, the actuator is operated exclusively based on sensor signals, regardless of the other driving situation or driving speed. This is accomplished by blocking movement of the force introduction element with the actuator, or with the position of the actuator, if the sensors detect an impending collision of the vehicle with another vehicle or with a stationary obstacle. However, if the sensors and an associated processing electronics recognize a potential collision of the vehicle with a living being, for example a pedestrian, then the actuator is activated to allow the force introduction element to move. The impact force on the pedestrian is thereby reduced, because the kinetic energy is not directly, i.e., "hard", converted into deformation work during impact, but initially transferred to the force introduction element which moves in the direction of the deformation element. This reduces the risk of injury or the severity of injuries sustained during impact. It should be mentioned at this point that recognition by sensors and processing of sensor signals for predicting the type of impact is not the subject of the present invention. Corresponding systems have already being developed, or improvements for such systems are currently in the development stage. It should also be noted that the terms deformation element and distortion element will in the following be used synonymously.

According to another embodiment of the invention, the absorption characteristic of the energy absorber is determined by the manner in which the vehicle moves, more precisely by its speed. The actuator typically allows movement of the force introduction element within a predetermined speed range of the vehicle. It is proposed in the context of the invention to design the device so that the force introduction element is allowed to move at a vehicle speed between 15 km/h and 40 km/h. In this modification, too, the design of a corresponding controller for controlling the actuator within the aforementioned speed threshold values, is not a subject of the invention, since the use of a speed-dependent control of vehicle systems (e.g., speed-dependent power steering) is already known for various applications.

In a possible modification of the device of the invention, the absorption characteristic of the energy absorber, which according to the aforedescribed embodiments operates in two stages, is further modified by varying the absorption characteristic in several stages. For example, when movement of the force introduction element is enabled, its length of travel can be changed depending on the driving situation before the impact energy is transferred to the deformation element. Stated differently, the aforementioned excursion limitation for the force introduction element moving inside the absorber can be varied depending on the driving situation.

Regarding the dependence of the absorption characteristic of the absorber, i.e., if the absorption characteristic should be varied by sensors depending on the expected impact situation or depending on the vehicle speed, those of skill in the art will appreciate that a sensor-based control and a speed-dependent control systems can also be coupled.

According to a practical embodiment, the device includes two tubular energy absorbers, each of which is mounted on a longitudinal vehicle support in the end section of a bumper with its longitudinal axis extending in the direction of the longitudinal vehicle support. Each of the energy absorbers has a guide tube receiving the deformation element, and further the cup-shaped force introduction element, as well as other energy absorber components. According to one embodiment, the force introduction element is movably guided on the outer periphery of a hollow-cylindrical guide element having recesses, and the shaft of an actuator which can be controlled depending on the driving situation extends through the deformation element. The aforementioned shaft extends into the guide element and has an eccentrically shaped a free end. The position of the eccentric element can be changed by the actuator in the circumferential direction and determines the radial position of at least two wings which are arranged inside the guide element perpendicular to the longitudinal axis of the energy absorber. In one position of the eccentric element, the wings are urged radially outwardly into the recesses of the guide element, so as to prevent the force introduction element connected with the bumper from moving. Conversely, in the other position of the eccentric element, the wings move radially inwardly by following the contour of the eccentric element and can move freely in the region of the recesses. This unobstructed motion enables limited axial travel of the force introduction element on the guide element in the direction of the deformation element.

According to an advantageous configuration of the aforedescribed embodiment, the actuators of the energy absorbers are arranged inside the longitudinal supports of a vehicle. The deformation element of the energy absorbers is preferably implemented as a deformation piston made of a glass-fiber reinforced plastic material.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the drawings, wherein like reference numerals delineate similar elements throughout the several views.

DETAILED DESCRIPTION OF THE PRESENTLY PREFERRED EMBODIMENTS

Figure 1:
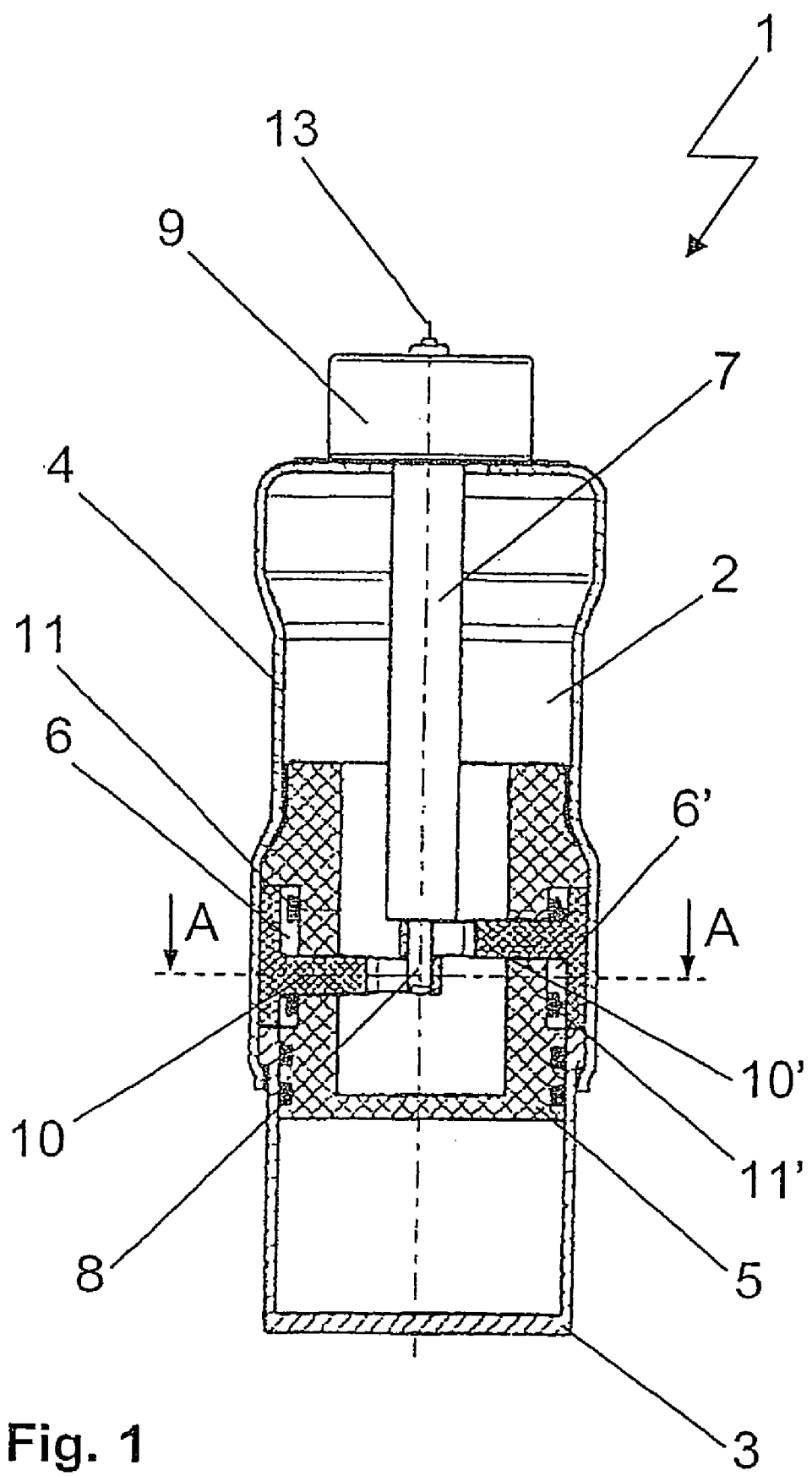
FIG. 1 a longitudinal cross-sectional view of an exemplary embodiment of the energy absorber, and FIG. 2 a cross-sectional view of the absorber taken along the line A-A of FIG. 1.

FIG. 1 shows the essential element of the device of the invention, namely the switchable energy absorber 1, or impact absorber. The axially upper end (as seen in the drawing) of the absorber 1, shown here in an axial cross-sectional view, is connected with the longitudinal support (not shown) of a vehicle, whereas the axially lower end is connected with a bumper (also not shown). Preferably, two of these energy absorbers are arranged between the bumper and the vehicle chassis.

The energy absorber 1 includes a guide tube 4 which receives the deformation element 2 or distortion element, the force introduction element 3, as well as a guide element 5 with recesses 6, 6' disposed on the outer circumference and wings 10, 10' supported in the region of the recesses 6, 6'. The deformation element 2, which can be implemented as a deformation piston made of glass-fiber reinforced plastic material, is penetrated by the shaft 7 of an actuator 9. The motor shaft 7 extends into the guide element 5 and has a free end formed as an eccentric element 8. The two wings 10, 10' are arranged perpendicular to the longitudinal axis 13 of the absorber and connected with the guide element 5 via springs 11, 11' inside the aforementioned recesses 6, 6' of the guide element 5. The two wings 10, 10' are also operatively connected with this eccentric contour by openings 12, 12'.

Figure 2:
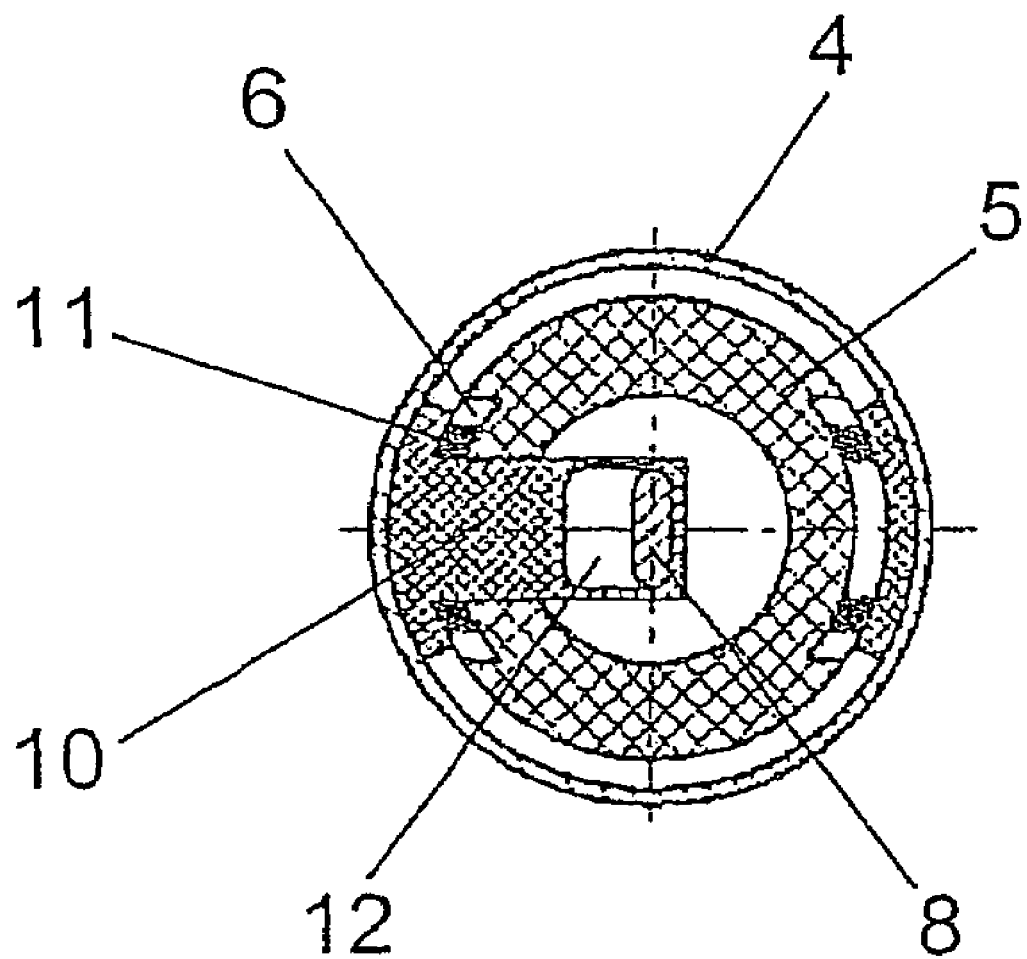

The operation of the absorber 1 can be more clearly illustrated with reference to FIG. 2. In the "switching state" of the absorber 1 depicted in FIG. 1, the kinetic energy generated during impact is transferred directly to the deformation element 2 via the force introduction element 3, the wings 10, 10' and the axially upper end of the guide element 5. Because force introduction element 3 guided on the guide element 5 is prevented from moving in this particular switching state of the energy absorber 1 in the axial direction, it forms together with the wings 10, 10' and the upper portion of the guide element 5 a rigid connection, which upon impact transfers the energy directly to the deformation element 2. However, if a sensor of the vehicle recognizes before impact the risk for a potential collision with a pedestrian, then the shaft 7 of the actuator 9, in particular the eccentric element 8 on its end, is rotated by 90° by suitably controlling the actuator 9. As seen in FIG. 2, the rotating eccentric element 8 then moves the wing 10 radially inwardly against the spring force across the inside contour of the opening 12, which is formed on the radially inner end of the wing 10 and operatively connected with the eccentric element. The same applies to the other wing 10', which is not visible in the cross-sectional view of FIG. 2. Because the wings 10, 10' move radially inwardly, the radially outer regions of the recesses 6, 6' formed in the guide element 5 become free and allow unhindered travel of the force introduction element 3 in axial direction upon impact. The force acting on the force introduction element 3 in the energy absorber 1 can be dissipated by moving the force introduction element 3 against a pretensioned gas cushion. The kinetic impact energy is initially transferred as motion energy to the force introduction element 3 and partially dissipated, and then transferred to the deformation element 2 only after contact between the force introduction element 3 and the guide element 5, where it is converted into deformation work. Because the impact energy is not immediately dissipated in a "hard" manner, the force of the impact, for example for the lower leg of a pedestrian, is significantly reduced.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

List of Reference Numerals 1 absorber or energy absorber
2 deformation element or distortion element
3 force introduction element
4 guide tube
5 guide element
6, 6' recesses
7 shaft
8 eccentric element
9 actuator
10, 10' wings
11, 11' spring
12, 12' opening
13 longitudinal axis

What is claimed is:

1. A device for absorption of impact energy on an automobile vehicle, with at least one energy absorber arranged between a bumper and the vehicle chassis and having a deformation element which deforms in the event of a collision, whereby the energy generated during the collision on the vehicle is at least partially converted by its deformation into deformation work, wherein the absorption characteristic of the at least one energy absorber (1) depends on the driving situation, by supplying the impact energy to the deformation element inside the at least one energy absorber (1) through at least one force introduction element (3), which either forms in cooperation with other elements (5, 10, 10') a rigid arrangement which transfers the impact energy directly to the deformation element (2) for conversion into deformation work, or transfers the impact energy only after an excursion-limited motion inside the at least one energy absorber (1) to the deformation element (2) for conversion into deformation work, whereby the force introduction element (3) is blocked or released for movement by an actuator (7, 8, 9), with the actuator being operated based on a driving situation that is determined by the motion characteristic of the vehicle and/or by a driving situation detected by sensors.

2. The device according to claim 1, wherein the actuator (7, 8, 9) is operated in response to sensors signals so as to prevent the force introduction element (3) from moving upon detection by the sensors of an impending collision of the vehicle with another vehicle or with a stationary obstacle, but to allow actuator motion if a collision with a living being, is anticipated.

3. The device according to claim 1, wherein the actuator (7, 8, 9) is capable of releasing the force introduction element (3) when the vehicle travels within a predetermined speed range.

4. The device according to claim 3, wherein the force introduction element (3) is capable of moving at a vehicle speed between 15 and 40 km/h.

5. The device according to claim 1, wherein the distance traveled by the force introduction element (3) before the impact energy is transferred to the deformation element (2) can be changed depending on the driving situation.

6. The device according to claim 1, wherein the at least one energy absorber comprises two tubular energy absorbers (1), each mounted on a longitudinal vehicle support in the end section of a bumper and having a longitudinal axis extending in the direction of the longitudinal vehicle support, wherein each of the two tubular energy absorbers (1) comprise a guide tube (4) which receives the deformation element (2), and further a cup-shaped force introduction element (3) as well as other elements (5, 7,11, 11'), wherein the force introduction element (3) is movably guided on the outer periphery of a hollow-cylindrical guide element (5) having recesses (6, 6') and wherein the deformation element (2) is penetrated by a shaft (7) of the actuator (9) which can be controlled depending on the driving situation, with the shaft (7) extending into the guide element (5) and forming an eccentric element (8) on its free end, with the position of the eccentric element (8), which can be changed by the actuator (9) in the circumferential direction, determining the radial position of at least two wings (10, 10') which have an opening (12, 12') and are arranged inside the guide element (5) perpendicular to the longitudinal axis of each of the two tubular energy absorbers, so that the wings (10, 10') are either urged radially outwardly into the recesses (6,6') of the guide element (5) by a force exerted by a spring (11, 11'), thereby blocking movement of the force introduction element (3) connected with the bumper, or the wings (10, 10') are urged radially inwardly by following with their opening (12, 12') the contour of the eccentric element (8), whereby unimpeded strokes are enabled in the region of the recesses (6, 6'), which enable a limited axial motion of the force introduction element (3) on the guide element (5) in the direction of the deformation element (2).

7. The device according to claim 6, wherein the actuator (9) of each of the two tubular energy absorbers (1) is arranged inside the longitudinal supports of a vehicle.

8. The device according to claim 1, wherein the deformation element (2) of at least one energy absorber (1) is implemented as a deformation piston made of a glass-fiber reinforced plastic material.

* * * * *